US007827253B2

(12) United States Patent
Jones et al.

(10) Patent No.: US 7,827,253 B2
(45) Date of Patent: Nov. 2, 2010

(54) METHODS, SYSTEMS, AND COMPUTER PROGRAM PRODUCTS FOR DYNAMICALLY ANNOTATING WEB PAGES PASSED VIA A MESSAGING APPLICATION

(75) Inventors: Angela Richards Jones, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 11/459,485

(22) Filed: Jul. 24, 2006

(65) Prior Publication Data

US 2008/0021977 A1    Jan. 24, 2008

(51) Int. Cl.
    G06F 15/16    (2006.01)
(52) U.S. Cl. .................. 709/217; 709/218; 709/219; 709/216; 709/227; 709/246; 715/205; 715/234
(58) Field of Classification Search .................. 709/217, 709/216, 218, 227
    See application file for complete search history.

(56) References Cited

U.S. PATENT DOCUMENTS

| 6,175,842 | B1 | 1/2001 | Kirk et al. |
| 6,571,295 | B1 | 5/2003 | Sidana |
| 6,687,877 | B1 * | 2/2004 | Sastry et al. ................ 715/201 |
| 6,859,909 | B1 | 2/2005 | Lerner et al. |
| 7,058,892 | B1 * | 6/2006 | MacNaughton et al. ..... 715/738 |
| 7,437,725 | B1 * | 10/2008 | Chang et al. ................ 718/100 |
| 2002/0080170 | A1 | 6/2002 | Goldberg et al. |
| 2005/0081159 | A1 | 4/2005 | Gupta et al. |
| 2005/0160357 | A1 | 7/2005 | Rivette et al. |
| 2006/0020883 | A1 | 1/2006 | Kothari et al. |

* cited by examiner

*Primary Examiner*—Ario Etienne
*Assistant Examiner*—Sahera Halim
(74) *Attorney, Agent, or Firm*—Cantor Colburn LLP; Joseph Bracken

(57) ABSTRACT

A method, system, and computer program product for dynamically annotating Web pages passed via a messaging application is provided. The method includes transmitting a Web page and a graphical user interface (GUI) to a requester of the Web page. The GUI directs the requester to provide annotations to at least a portion of the Web page content, which annotations are translated to instructions interpretable by a Web browser. The instructions are bundled with a uniform resource locator (URL) of the Web page at a computer processing device of the requester. The method also includes receiving a request for the Web page from a second requester who received the instructions bundled with the URL of the Web page within a message transmitted by the requester. The method further includes directing a Web browser of the second requester to apply the instructions as the Web page is being rendered. Application of the instructions causes the Web browser to render the Web page along with the annotations.

15 Claims, 3 Drawing Sheets

METHODS, SYSTEMS, AND COMPUTER PROGRAM PRODUCTS FOR DYNAMICALLY ANNOTATING WEB PAGES PASSED VIA A MESSAGING APPLICATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to World Wide Web ("Web") applications, and particularly to methods, systems, and computer program products for dynamically annotating Web pages passed via a messaging application.

2. Description of Background

Messaging technologies such as instant messaging and email allows users to pass uniform resource locators (URLs) to each other quickly. Oftentimes, when a user sends a URL to another user via a messaging technology, the intention is to "point to" or "emphasize" a particular portion of interest within the Web page.

Current technologies, however, do not provide a way for a user to add emphasis to a particular portion of a Web page. That is, there is no way to annotate or mark up a Web page (e.g., static Web pages residing on a backend HTTP or application server that are not directly accessible by the user sending the URL).

What is needed, therefore, is a way to provide the ability to "point to" or "emphasize" a portion of a Web page, that is transmitted, e.g., as a link to a recipient such that the recipient may perceive the emphasized portion, and the emphasized portion is not persisted within the original Web page stored on the back end system.

SUMMARY OF THE INVENTION

The shortcomings of the prior art are overcome and additional advantages are provided through the provision of a method for dynamically annotating Web pages passed via a messaging application is provided. The method includes transmitting a Web page and a graphical user interface (GUI) to a requester of the Web page. The GUI directs the requester to provide annotations to at least a portion of the Web page content, which annotations are translated to instructions interpretable by a Web browser. The instructions are bundled with a uniform resource locator (URL) of the Web page at a computer processing device of the requester. The method also includes receiving a request for the Web page from a second requester who received the instructions bundled with the URL of the Web page within a message transmitted by the requester. The method further includes directing a Web browser of the second requester to apply the instructions as the Web page is being rendered. Application of the instructions causes the Web browser to render the Web page along with the annotations.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides the ability to "point to" or "emphasize" a portion of a Web page, that is transmitted, e.g., as a link to a recipient such that the recipient may perceive the emphasized portion, and the emphasized portion is not persisted within the original Web page stored on the back end system.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
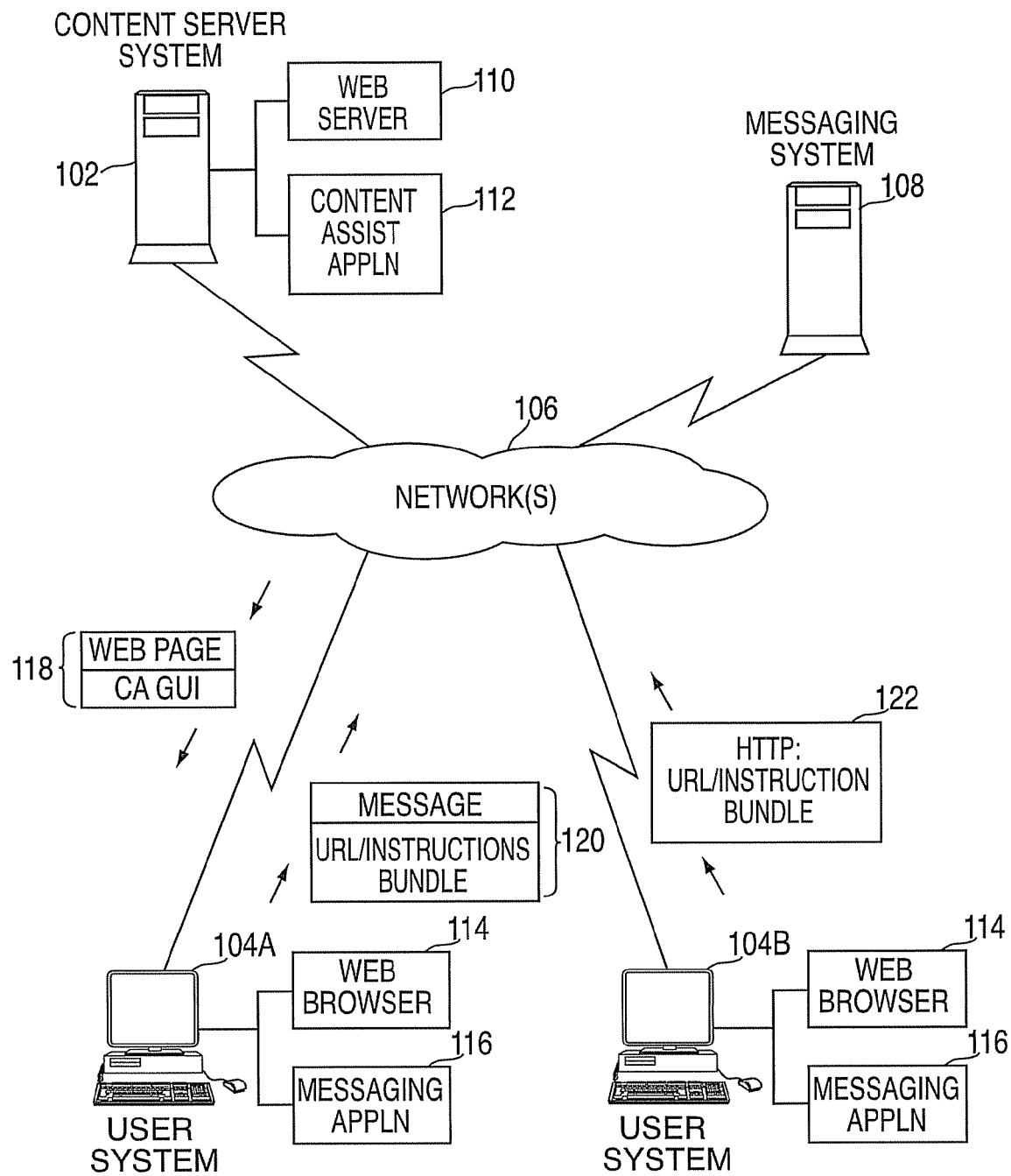
FIG. 1 illustrates one example of a block diagram depicting a system upon which Web page annotation processes may be implemented.

Turning now to the drawings in greater detail, it will be seen that in FIG. 1 there is a system upon which the Web page annotation processes may be implemented in an exemplary embodiment. The system includes a content server system 102 in communication with user systems 104 over one or more network(s) 106. In addition, the system of FIG. 1 includes a messaging server 108 in communication with user systems 104 via network(s) 106.

Content server system 102 may be implemented as a back end server or application server system that transmits Web pages of content to requesting systems (e.g., user systems 104). The content server system 102 may be logically addressable over the Web via a uniform resource locator (URL) that uniquely identifies the content server system. Web pages provided by the content server system 102 may be retrieved, e.g., via a HTTP request from one or more user systems 104. The content server system 102 executes a Web server 110 for facilitating the transmission of Web pages to requesting entities. In addition, the content server system 102 implements a content assist application 112 for providing the annotation services described herein.

User systems 104 may be implemented via computer processing devices (e.g., a personal desktop computer, laptop, personal digital assistant (PDA), or other similar types of devices). User system 104A refers to a computer processing device operated by a user (also referred to herein as a requester) who annotates a Web page via the annotation services described herein, while user system 104B refers to a computer processing device operated by a recipient of a message transmitted by user system 104A, whereby the message includes a Web page reference (e.g., link) that has been processed (i.e., annotated) by the operator of user system 104A. The particular functionality of these user systems 104 is described herein for purposes of illustration. It will be understood, however, that each of the user systems 104A and 104B may reciprocate roles with respect to annotating Web pages and sending/receiving messages with the annotations.

User systems 104A and 104B each implement a Web browser application 114 and messaging application 116 (e.g., email application, instant messaging application, etc., or a combination of messaging applications). Messages generated via the messaging applications 116 may be transmitted between user systems 104 via messaging system 108. Messaging system 108 may be an email service provider entity, instant messaging service provider entity, etc. Web browser applications 114 enable users of user systems 104 to request and receive content (e.g., Web pages) from one or more content server systems (e.g., content server system 102) over network(s) 106.

Network 106 may be any suitable network for facilitating communications between network entities (e.g., Internet-enabled devices/systems, such as content server system 102, messaging system 108, and user systems 104). For example, network 108 may be a global network (e.g., Internet), a wide area or local area network, etc., and transmits content including Web pages and messages via, e.g., packet-switching technologies.

In response to a request for a Web page from a user system (e.g., user system 104A), content server system 102 transmits Web pages, along with a content assist graphical user interface (GUI) 118 to the user system. The GUI provides the user of user system 104A with guidance on incorporating annotations to the Web page as described herein. The GUI may be transmitted to the user system, e.g., as a servlet or similar type of technique. In alternative embodiments, the GUI of package 118 may be resident on the user system via the Web browser (e.g., Web browser 114). The GUI provides direction on assisting the user of user system 104 to annotate portions of the Web page transmitted as part of package 118. By way of non-limiting example, the annotations may include changing font characteristics (e.g., color, size, bold, etc.). The annotations may also include encapsulating a portion of the Web page with a geometric shape (e.g., square, circle, etc.). These, and other types of annotations, are contemplated by the annotation services described herein.

Once the user of user system 104A indicates the desired annotations to the Web Page, the annotations may be translated to instructions that are interpretable by the Web browser (e.g., Web browser 114). The user system 104A may generate a message via messaging application 116 that includes a link to the URL of the Web page. The link includes the instructions are bundled with the URL and is transmitted as a package 120 to a recipient (e.g., a user of user system 104B). The recipient, in turn, may access the link to the URL, which causes a HTTP request to the content server system 102 of the URL. The HTTP request includes the instructions that were bundled along with the URL in the message. The HTTP request including instructions is represented in FIG. 1 as URL/instruction bundle 122. These features are described further in FIGS. 2 and 3.

Figure 2:
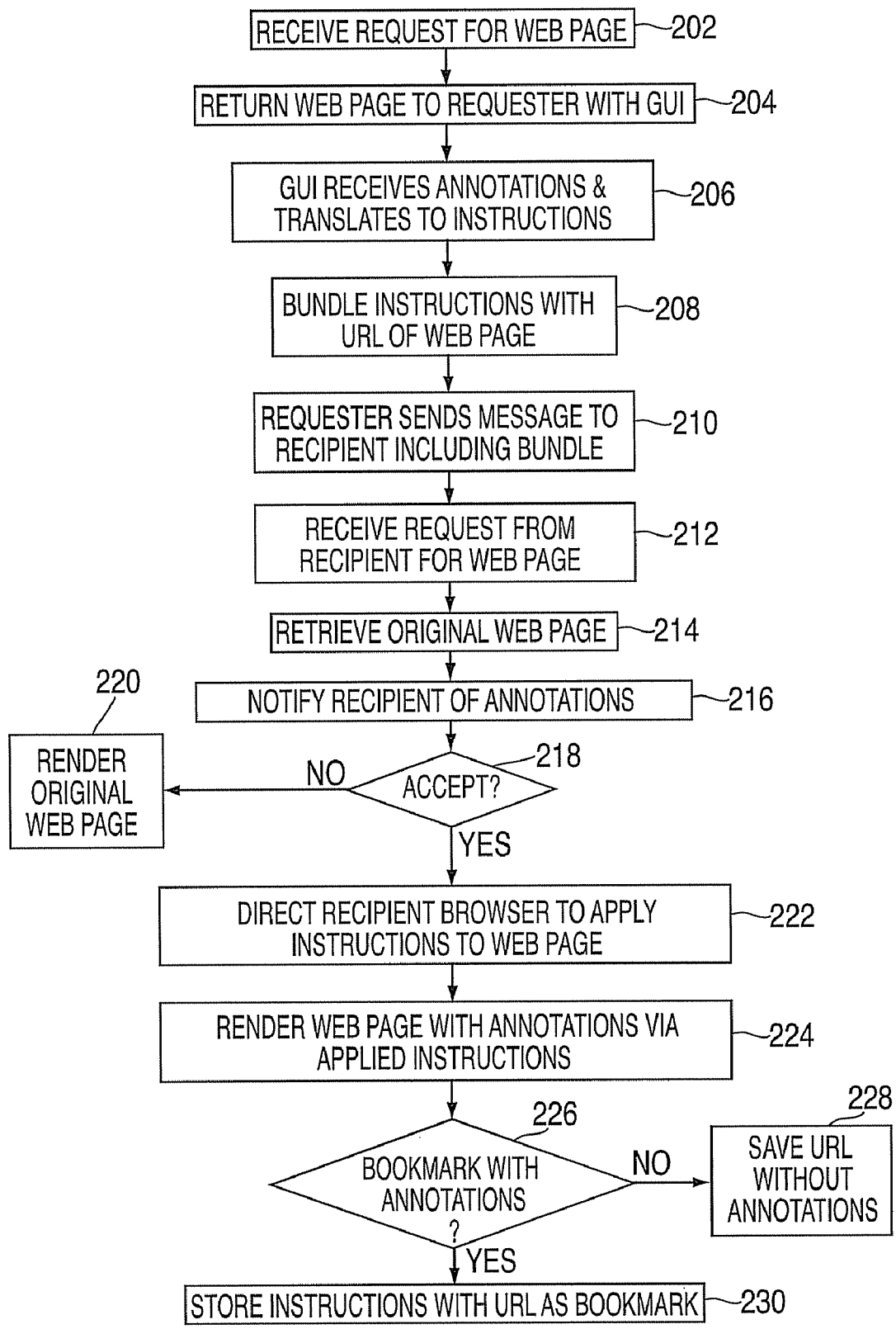
FIG. 2 illustrates one example of a flow diagram describing a process for implementing the Web page annotation activities.

As indicated above, the annotation services provide the ability to "point to" or "emphasize" a portion of a Web page, that is transmitted, e.g., as a link to a recipient such that the recipient may perceive the emphasized portion, and the emphasized portion is not persisted within the original Web page stored on the back end system. Turning now to FIG. 2, a flow diagram describing a process for implementing the annotation services will now be described in exemplary embodiments.

A user of user system 104A opens Web browser 114 and requests access to a Web page at content server system 102. The request is received at the content server system 102 at step 202. At step 204, the content server system 102 returns the requested Web page, along with content assist GUI, collectively referenced as block 118 in FIG. 1, via the content assist application 112. In alternative embodiments, as described above, the GUI may reside on the user system, e.g., as part of the Web browser application 114. The GUI enables the user of user system 104A to provide annotations to the Web page received from the content server system 102. The annotations provide the ability to emphasize specified portions of interest within the Web page, thereby distinguishing the emphasized portions from the remaining content in the Web page. These annotations are not persisted at the content source (i.e., content server system 102), but rather are associated only with a copy of the Web page provided to the user system 104A at this point in the process. The association, in turn, is facilitated via instructions generated as a result of translation of the annotations at step 206, which are bundled along with the URL of the Web page in step 208. The bundling may be implemented, e.g., by appending the instructions to the URL as visible or hidden text or by including the URL and the instructions in a structured mark up language (e.g., extensible Markup Language (XML)) package.

At step 210, the user of user system 104A generates a message (e.g., email/instant messaging via messaging application 116) that includes the link to the Web page. The URL is bundled with the instructions within the message (collectively referred to as block 120). The user at user system 104B receives the message and the link and accesses the link to retrieve the Web page from content server system 102.

At step 212, the content server system 102 receives the request from the user system 104B (referred as a second requester). The content server system 102 retrieves the original Web page at step 214. Because the HTTP request with URL/instruction bundle 122 includes the instructions that identify the particular annotations made by the user system 104A, the content server system 102 is able to associate the annotations with the Web page and the targeted recipient of the annotations.

Figure 3:
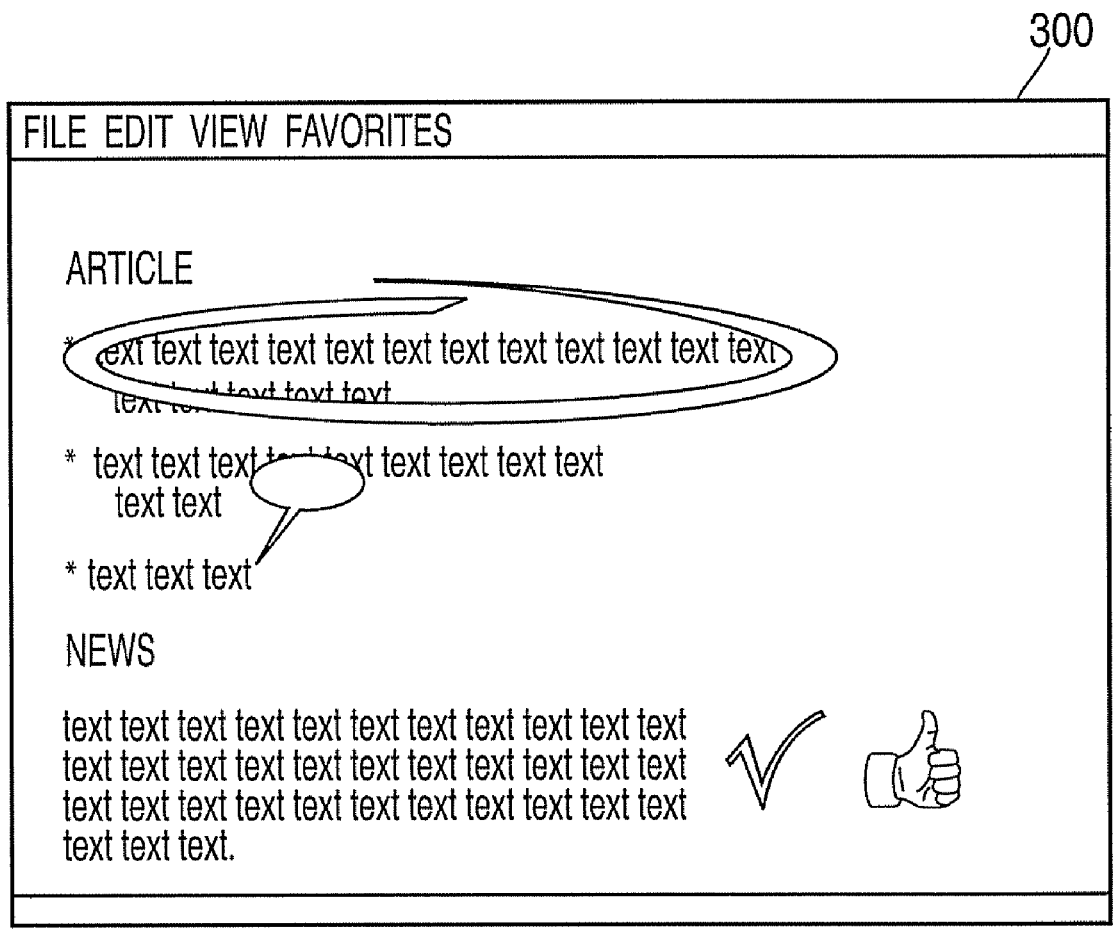
FIG. 3 illustrates one example of a Web page annotated via the Web page annotation processes.

Before rendering the Web page to the recipient, the content assist application 112 notifies the second requester that the sender (i.e., user system 104A) has provided annotations at step 216. The content assist application 112 queries the recipient to accept or reject the annotations at step 218. If the recipient rejects the annotations, the content server system 102 renders the original Web page (without annotations) to the user system 104B via web server 110 at step 220. Otherwise, the content assist application 112 directs the recipient Web browser to apply the instructions to the Web page before the Web page is rendered to the recipient at step 222. Once the instructions have been applied, the altered, or emphasized Web page is rendered at the recipient user system 104B at step 224. A sample Web page with annotations is shown in FIG. 3.

At step 226, the recipient is queried whether to bookmark the annotated Web page. If the recipient is not interested in bookmarking the annotated Web page but desires to bookmark the original Web page, the corresponding URL of the Web page is stored at the user system 104B at step 228. Otherwise, the instructions are stored along with the URL of the corresponding Web page as a bookmark on the user system 104B at step 230.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for dynamically annotating Web pages passed via a messaging application, comprising:
   transmitting a Web page and a graphical user interface (GUI) to a requester of the Web page, the GUI including a content assist GUI, the content assist GUI transmitted from a server and directing the requester to provide annotations to at least a portion of the Web page content;
   translating the annotations into instructions interpretable by a Web browser, the instructions bundled with a uniform resource locator (URL) of the Web page at a computer processing device of the requester, the annotations associated to the Web page by being appended to the URL;
   receiving a request for the Web page from a second requester, the second requester receiving the instructions bundled with the URL of the Web page within a message transmitted by the computer processing device of the requester to a computer processing device of the second requester, the request from the second requester including the instructions bundled with the URL of the Web page;
   transmitting the Web page to the second requester in response to the receiving of the request, the Web page transmitted in its original state without the annotations applied; and
   directing a Web browser at the computer processing device of the second requester to apply the instructions as the Web page is being rendered, wherein application of the instructions causes the Web browser of the computer processing device of the second requester to render the Web page along with the annotations provided by the requester.

2. The method of claim 1, further comprising:
   notifying the second requester that the Web page requested includes annotations; wherein the directing a web browser of the computer processing device of the second requester to apply instructions as the Web page is being rendered is performed in response to an acceptance by the second requester to receive the annotations.

3. The method of claim 1, wherein the annotations include:
   changing font characteristics of the Web page content; and
   encapsulating an area of the Web page content with a geometric shape.

4. The method of claim 1, wherein the instructions are bundled with the URL of the Web page by creating a package that includes at least one of:
   appending the instructions to the URL as visible or hidden text; and
   including the URL and the instructions as a package implemented via a structured markup language.

5. The method of claim 1, further comprising saving the instructions bundled with the URL of the Web page for subsequent use.

6. A system for dynamically annotating Web pages passed via a messaging application, comprising:
   a content server system; and
   a content assist application executing on the content server system, the content assist application performing:
   transmitting a Web page via a Web server implemented by the content server system and a graphical user interface (GUI) to a requester of the Web page, the GUI including a content assist GUI, the content assist GUI transmitted from a server and directing the requester to provide annotations to at least a portion of the Web page content;
   translating the annotations into instructions interpretable by a Web browser, the instructions bundled with a uniform resource locator (URL) of the Web page at a computer processing device of the requester, the annotations associated to the Web page by being appended to the URL;
   receiving a request for the Web page from a second requester, the second requester receiving the instructions bundled with the URL of the Web page within a message transmitted by the computer processing device of the requester to a computer processing device of the second requester, the request from the second requester including the instructions bundled with the URL of the Web page;
   transmitting the Web page to the second requester in response to the receiving of the request, the Web page transmitted in its original state without the annotations applied; and
   directing a Web browser at the computer processing device of the second requester to apply the instructions as the Web page is being rendered, wherein application of the instructions causes the Web browser of the computer processing device of the second requester to render the Web page along with the annotations provided by the requester.

7. The system of claim 6, wherein the content assist application further performs:
   notifying the second requester that the Web page requested includes annotations; wherein the directing a web browser of the computer processing device of the second requester to apply instructions as the Web page is being rendered is performed in response to an acceptance by the second requester to receive the annotations.

8. The system of claim 6, wherein the annotations include:
   changing font characteristics of the Web page content; and
   encapsulating an area of the Web page content with a geometric shape.

9. The system of claim 6, wherein the instructions are bundled with the URL of the Web page by creating a package that includes at least one of:

appending the instructions to the URL as visible or hidden text; and including the URL and the instructions as a package implemented via a structured markup language.

10. The system of claim 6, wherein the instructions bundled with the URL are saved for subsequent use.

11. A computer program product for dynamically annotating Web pages passed via a messaging application, comprising:

a non-transitory tangible storage device storing instructions, the instructions executable by a machine for implementing a method, comprising:

transmitting a Web page and a graphical user interface (GUI) to a requester of the Web page, the GUI including a content assist GUI, the content assist GUI transmitted from a server and directing the requester to provide annotations to at least a portion of the Web page content;

translating the annotations translated to into instructions interpretable by a Web browser, the instructions bundled with a uniform resource locator (URL) of the Web page at a computer processing device of the requester, the annotations associated to the Web page by being appended to the URL;

receiving a request for the Web page from a second requester, the second requester receiving the instructions bundled with the URL of the Web page within a message transmitted by the computer processing device of the requester to a computer processing device of the second requester, the request from the second requester including the instructions bundled with the URL of the Web page;

transmitting the Web page to the second requester in response to the receiving of the request, the Web page transmitted in its original state without the annotations applied; and directing a Web browser at the computer processing device of the second requester to apply the instructions as the Web page is being rendered, wherein application of the instructions causes the Web browser of the computer processing device of the second requester to render the Web page along with the annotations provided by the requester.

12. The computer program product of claim 11, further comprising instructions for implementing:

notifying the second requester that the Web page requested includes annotations; wherein the directing a web browser of the computer processing device of the second requester to apply instructions as the Web page is being rendered is performed in response to an acceptance by the second requester to receive the annotations.

13. The computer program product of claim 11, wherein the annotations include:

changing font characteristics of the Web page content; and encapsulating an area of the Web page content with a geometric shape.

14. The computer program product of claim 11, wherein the instructions are bundled with the URL of the Web page by creating a package that includes at least one of:

appending the instructions to the URL as visible or hidden text; and including the URL and the instructions as a package implemented via a structured markup language.

15. The computer program product of claim 11, further comprising instructions for saving the instructions bundled with the URL of the Web page for subsequent use.

* * * * *